Jan. 2, 1962 R. B. SCHRECONGOST 3,015,752
FLASH-OVER SUPPRESSION IN CATHODE RAY TUBES
Filed March 9, 1959
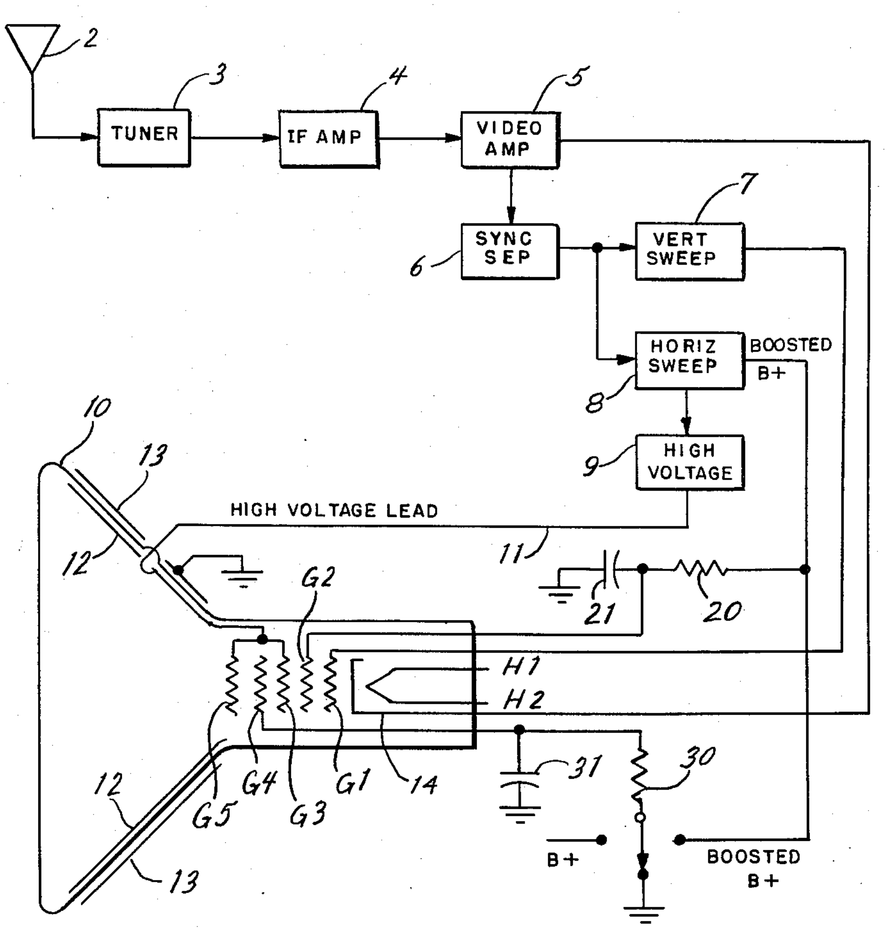
INVENTOR.
Ray B. Schrecongost
BY John L. Thiegoff
ATTORNEY United States Patent Office 3,015,752

Patented Jan. 2, 1962

3,015,752

FLASH-OVER SUPPRESSION IN CATHODE RAY TUBES

Ray B. Schrecongost, Park Ridge, Ill., assignor to Admiral Corporation, Chicago, Ill., a corporation of Delaware Filed Mar. 9, 1959, Ser. No. 798,251
2 Claims. (Cl. 315—16)

This invention relates to means for suppressing high voltage flash-over between elements in a cathode ray tube.

In cathode ray tubes a number of electrodes or grids are arranged, in conjunction with a cathode or electron emission means, to focus and control the intensity of an electron stream which is directed at the tube face. Since the tube is evacuated the distance between electrodes can be made relatively small in spite of the fact that very high potentials exist between some of the electrodes.

As is well known in the television art, much effort has been, and is being, expended on reducing the overall length of the viewing tube. Recent improvements have included the use of a much smaller electron gun arrangement, with consequent closer spacing of the electrodes. The trend toward brighter and sharper pictures has required the use of much higher accelerating potentials, on the order of 18 kv. in some cases, than has heretofore been necessary. This combined effect of close spacing of electrodes and higher accelerating potentials has increased the problem of voltage flash-over.

Accordingly it is the object of this invention to provide a novel means for suppressing flash-overs in cathode ray tubes.

In the drawing there is shown a partial schematic of a television system. It will be noted that most of the circuitry is shown in block form for simplicity since it does not constitute a part of the invention. A television signal is received by antenna 2, coupled to tuner 3, heterodyned, fed to IF amplifier 4 and to video amplifier 5 in a well known manner. Video amplifier 5 feeds a synchronizing signal separator 6 and cathode 14 of picture tube 10. Synchronizing signal separator 6 is coupled to vertical sweep circuit 7 and horizontal sweep circuit 8 which generate the vertical and horizontal sweep frequencies for the deflection coils (not shown) of tube 10. The circuit as described thus far is extremely simplified, such things as automatic gain control, power supply connections, deflection circuits, and sound circuitry having been omitted.

The horizontal sweep circuit 8 is coupled to high voltage circuit 9 which feeds, via a high voltage lead 11, a conductive coating 12 (which is generally of aluminum) and electrodes G3 and G5 of tube 10. Also contained in horizontal sweep circuit 8 is circuitry for obtaining a boosted B+ voltage. Cathode ray tube 10 contains, in addition to acceleration electrodes G3 and G5, a focus electrode G4 which is connectable through a resistance or reactance 30 to either B+, ground or boosted B+. As illustrated picture tube 10 is of the automatic focus type, that is, no focus coil is required. In operaion, focusing elecrode G4 is connected in the one position of the above-mentioned three positions that yields the best focus. Electrode G4 is also bypassed to ground via a capacitor 31. As shown in the drawing, electrode G4 is placed between electrodes G3 and G5. Electrode G2, also an accelerating electrode, is connected through a resistance or reactance 20 to the boosted B+ supply and is similarly bypassed to ground through a capacitor 21. Electrode G1 is connected to vertical sweep circuit 7 and controls blanking of the cathode ray beam during vertical retrace. Cathode 14 is maintained at operating temperature by a heater winding having terminals H1 and H2 which are connected to an appropriate source of potential (not shown).

Another conductive coating 13 is applied to the outside of tube 10 and is grounded. As is well known in the television art, conductive coating 12 and conductive coating 13 form a capacitor (with the glass of tube 10 as the dielectric) which filters out ripple in the high voltage and equalizes the charge on the glass of tube 10. The capacitance is generally on the order of 1200–3000 micro-microfarads. It is this capacitance which supplies most of the energy in a high voltage flash-over.

Using representative values, electrodes G3 and G5 may be operating at 18 kv., electrode G2 at 500 volts and electrode G4 at ground, 250 volts, or 500 volts. The spacing between these electrodes is on the order of 1/16 to 1/8 inch. Consequently, a very high potential gradient is set up and, even with good production control technique, many cathode ray tubes will be prone to flash-overs between electrodes.

Generally these flash-overs are extremely short in duration, but since the leads to the low voltage electrodes are brought out of tube 10 to base pins (not shown) which are relatively close together, a flash-over inside tube 10 to one of the low voltage electrodes places a high voltage on the base pin connected to this electrode and may cause flash-over to the other pins. Since the latter flash-over would be in air, ions would be present to sustain the arc and considerable damage to the tube and its associated television circuitry may occur.

In the drawing there is shown a very simple and very inexpensive means to prevent this damage. An effective high voltage short circuit is placed on focus electrode G4 by bypassing focus electrode G4 to ground through a capacitor 31. In the event of a flash-over to electrode G4 capacitor 31 will act as a shunt to ground and tend to suppress the flash-over. Similarly if a flash-over occurs to electrode G2 capacitor 21 will tend to suppress it.

It has been found that by using values of paper capacitors of .047 microfarad and higher for capacitors 21 and 31 that good suppressing action can be achieved. Somewhat lower values of capacitance have produced good results with ceramic capacitors of 1.5 kv. to 3 kv. ratings. It is important that capacitors capable of efficiently bypassing high frequency energy be used, that is, capacitors having very little inductance and resistance. Consequently, electrolytics have not proven adequate for this purpose. The voltage rating of the capacitors need not be much higher than normal required operating potentials dictate since if the capacitor is chosen in accordance with the above, it will prevent high voltage build up across it. Generally a rating of two to three times normal operating potentials will give an adequate safety margin.

It is, of course, contemplated that these capacitors may be made integral with the tube, that is, actually placed inside the tube structure. It will also be understood that the invention is not intended to be limited to the arrangement of electrodes as shown in tube 10 but is equally applicable to other tubes using a different arrangement from that shown, such as tubes that do not have an electrode G3. The method shown for coupling the signal to the tube is, of course a matter of choice.

What has been described is a very simple, economic and novel means for protecting the circuitry feeding a cathode ray tube from harmful effects of flash-overs between high voltage and low voltage electrodes within the tube. While the invention has been described in conjunction with a television system, it will be understood that the invention is limited only as defined in the appended claims.

What is claimed is:

1. In combination in a television system; a cathode ray tube; a plurality of low voltage electrodes in said tube; at least one high voltage electrode in said tube; base means on said tube having connectors for extending connections from outside said tube to said low voltage electrodes; said high voltage electrode being positioned in close proximity to at least one of said low voltage electrodes and producing a potential gradient of a magnitude such that the probability of internal flashovers therebetween is high; means for preventing excessive voltage buildup on said connectors in said base means in the event of said flashovers comprising: a capacitor having a low value of internal series impedance connected in bypass relationship with said one low voltage electrode.

2. In combination in a television receiver; a cathode ray tube having beam forming means, a first accelerating electrode, a second accelerating electrode and a focusing electrode mounted therein in the order named; first means for producing a direct current voltage which is relatively low with respect to a reference potential; first, second and third connections joining said first means, on the one hand, with said beam forming means, said first accelerating electrode, and said focusing electrode, respectively, on the other hand; second means for producing a voltage which is relatively high with respect to said reference potential; means for applying said high voltage to said second accelerating electrode; a resistor interposed in each of said second and third connections; and a pair of capacitors having low internal series impedance connected from said first accelerating electrode, and from said focusing electrode to said source of reference potential, respectively.

References Cited in the file of this patent

UNITED STATES PATENTS

| | | |
|---|---|---|
| 2,194,380 | Broadway et al. | Mar. 19, 1940 |
| 2,771,566 | Baracket | Nov. 20, 1956 |